United States Patent [19]

Morikawa

[11] Patent Number: 5,579,406
[45] Date of Patent: Nov. 26, 1996

[54] APPARATUS AND METHOD FOR OUTLINE DATA PROCESSING

[75] Inventor: Yuko Morikawa, Kawasaki, Japan

[73] Assignee: Fuji Xerox Co., Ltd., Japan

[21] Appl. No.: 109,602

[22] Filed: Aug. 19, 1993

Related U.S. Application Data

[63] Continuation of Ser. No. 748,798, Aug. 22, 1991, abandoned.

[30] Foreign Application Priority Data

Aug. 24, 1990 [JP] Japan .................................... 2-223499

[51] Int. Cl.$^6$ ...................................................... G06T 3/40
[52] U.S. Cl. .......................... 382/200; 382/202; 382/298; 395/170
[58] Field of Search ............................... 382/47, 22, 24, 382/21, 183, 200, 202, 193, 199, 298; 395/150, 151, 139; 345/128, 143, 144

[56] References Cited

U.S. PATENT DOCUMENTS

| | | | |
|---|---|---|---|
| 4,110,736 | 8/1978 | Kono | 382/22 |
| 4,346,377 | 8/1982 | Green | 345/128 |
| 4,424,588 | 1/1984 | Satoh et al. | 382/48 |
| 5,042,075 | 8/1991 | Sato | 382/47 |
| 5,099,435 | 3/1992 | Collins et al. | 395/150 |
| 5,115,402 | 5/1992 | Matsushiro et al. | 395/141 |
| 5,295,240 | 3/1994 | Kajimoto | 395/151 |
| 5,313,573 | 5/1994 | Takahama | 345/144 |
| 5,319,358 | 6/1994 | Matinez et al. | 345/141 |
| 5,355,448 | 10/1994 | Uchino | 395/150 |
| 5,398,311 | 3/1995 | Seto | 345/143 |

FOREIGN PATENT DOCUMENTS 338622  6/1991  Japan .

*Primary Examiner*—Michael T. Razavi
*Assistant Examiner*—Jon Chang
*Attorney, Agent, or Firm*—Welsh & Katz, Ltd.

[57] ABSTRACT

An apparatus for pattern processing includes a display control unit for controlling display by a CRT, a keyboard, a CPU, a RAM, and the like, the CPU being adapted to control the apparatus and incorporating a segment-information extracting unit and a boundary-position-information setting unit, wherein the segment-information extracting unit extracts segments respectively parallel with an x-axis and a y-axis of the coordinate system from a plurality of segments constituting the outline, on the basis of at least two sets of coordinates indicating a position of each of the segments, while the boundary-position-information setting unit determines a horizontal boundary position of the outline on the basis of the respective sets of coordinates indicating the position of the segment parallel with the x-axis of the coordinate system, and determines a vertical boundary position of the outline on the basis of the respective sets of coordinates indicating the position of the segment parallel with the y-axis of the coordinate system.

12 Claims, 3 Drawing Sheets

APPARATUS AND METHOD FOR OUTLINE DATA PROCESSING

This is a continuation, of application Ser. No. 07/748,798, filed Aug. 22, 1991, now abandoned.

BACKGROUND OF THE INVENTION

1. Field of the Invention

The present invention relates to an apparatus and method for pattern processing for determining boundary positions of an outline used in outline correction at the time of effecting processing, such as enlargement and reduction, with respect to an outline of a pattern indicating a character, a code, or the like.

2. Description of the Related Art

As is known, an outline font system in which a pattern of a character, a figure, or the like is generated from outline font data has come to be widely adopted in desktop publishing (electronic publishing by using a personal computer). In this system, coordinates at a plurality of control points which shape an outline of the pattern are retained as data, and at the time of developing the pattern on a bit map, straight and/or curved lines passing through the coordinates at the control points are generated so as to form an outline, while the part inside the outline is blotted. The advantage of this system lies in that in effecting processing such as enlargement and reduction with respect to a pattern, a deterioration in the quality of the character can be avoided if the outline of the pattern is first enlarged or reduced before the outline is converted to a dot pattern, as compared with a case where the dot pattern is directly processed.

In developing a pattern on a bit map, the outline is corrected by making use of horizontal boundary positions and vertical boundary positions indicating a boundary of the outline. The horizontal boundary positions and the vertical boundary positions are conventionally determined one by one by relying upon the human perception by referring to the outline. For this reason, there has been a drawback in that in cases where the configuration of the outline is complicated or a multiplicity of outlines need to be processed, skill is required and the operation is liable to become complicated, causing much time and labor to be expended.

SUMMARY OF THE INVENTION

Accordingly, it is an object of the present invention to provide an apparatus and method for pattern processing capable of automatically setting horizontal boundary positions and vertical boundary positions on the basis of outline font data, thereby overcoming the above-described drawback of the conventional art.

To this end, in accordance with the present invention, there is provided an apparatus for pattern processing, comprising: a coordinate system in which an outline of a pattern is depicted; segment-extracting means for extracting segments respectively parallel with an x-axis and a y-axis of the coordinate system from a plurality of segments constituting the outline, on the basis of at least two sets of coordinates indicating a position of each of the segments; and boundary-position setting means for determining a horizontal boundary position of the outline on the basis of the respective sets of coordinates indicating the position of the segment parallel with the x-axis of the coordinate system, and for determining a vertical boundary position of the outline on the basis of the respective sets of coordinates indicating the position of the segment parallel with the y-axis of the coordinate system.

In accordance with the present invention, segments respectively parallel with the x-axis and the y-axis of the coordinate system are extracted from a plurality of segments constituting an outline. These segments are line segments of an outline, and the segments extracted are line segments parallel with the x-axis or the y-axis. In addition, a horizontal boundary position of the outline is determined on the basis of the coordinates indicating the position of each segment parallel with the x-axis, and a vertical boundary position of the outline is determined on the basis of the coordinates indicating the position of each segment parallel with the y-axis.

In addition, in accordance with the present invention, the segment-extracting means, upon extracting the segments parallel with the x-axis, sets the segments as either upper or lower segments depending on whether the respective segments are odd or even as counted from one end of the outline along the x-axis. In addition, the boundary-position setting means selects a maximum value and a minimum value from values of ordinates of the coordinates of the respective segments parallel with the x-axis, determines a mean value of the maximum value and the minimum value, sets as an outer horizontal boundary position and an inner horizontal boundary position horizontal boundary positions respectively based on an upper segment and a lower segment existing in one region obtained by dividing the coordinate system by a line parallel with the x-axis and indicated by the mean value, and sets as an outer horizontal boundary position and an inner horizontal boundary position horizontal boundary positions respectively based on an upper segment and a lower segment existing in another region obtained by dividing the coordinate system by the line parallel with the x-axis and indicated by the mean value.

For instance, if a segment parallel with the x-axis is located at an odd-numbered position from an upper end of the outline, that segment is set as an upper segment, and if a segment parallel with the x-axis is located at an even-numbered position, that segment is set as a lower segment. Then, a mean value of a maximum value and a minimum value among the values of the ordinates of the coordinates of the segments parallel with the x-axis, i.e., a mid-point of the outline, is determined. Furthermore, horizontal boundary positions respectively based on an upper segment and a lower segment existing in an upper region obtained by dividing the coordinate system by a line parallel with the x-axis and intersecting the mid-point are set as an outer horizontal boundary position and an inner horizontal boundary position, and horizontal boundary positions respectively based on an upper segment and a lower segment existing in a lower region obtained by dividing the coordinate system by that line are set as an outer horizontal boundary position and an inner horizontal boundary position.

Furthermore, in the present invention, the segment-extracting means, upon extracting the segments parallel with the y-axis, sets the segments as either left-hand or right-hand segments depending on whether the respective segments are odd or even as counted from one end of the outline along the y-axis. Meanwhile, the boundary-position setting means selects a maximum value and a minimum value from values of abscissas of the coordinates of the respective segments parallel with the y-axis, determines a mean value of the maximum value and the minimum value. Further, the boundary-position setting means sets as an outer vertical boundary position and an inner vertical boundary position vertical boundary positions respectively based on a left-hand segment and a right-hand segment existing in one region obtained by dividing the coordinate system by a line parallel with the y-axis and indicated by the mean value, and sets as an outer vertical boundary position and an inner vertical boundary position vertical boundary positions respectively based on a left-hand segment and a right-hand segment existing in another region obtained by dividing the coordinate system by the line parallel with the y-axis and indicated by the mean value.

For instance, if a segment parallel with the y-axis is located at an odd-numbered position from a left end of the outline, that segment is set as a left-hand segment, and if a segment parallel with the y-axis is located at an even-numbered position, that segment is set as a right-hand segment. Then, a mean value of a maximum value and a minimum value among the values of the abscissas of the coordinates of the segments parallel with the y-axis, i.e., a mid-point of the outline, is determined. Furthermore, vertical boundary positions respectively based on a left-hand segment and a right-hand segment existing in a left-hand region obtained by dividing the coordinate system by a line parallel with the y-axis and intersecting the mid-point are set as an outer vertical boundary position and an inner vertical boundary position, and vertical boundary positions respectively based on a left-hand segment and a right-hand segment existing in a right-hand region obtained by dividing the coordinate system by that line are set as an outer vertical boundary position and an inner vertical boundary position.

In addition, in accordance with another aspect of the invention, there is provided a method for pattern processing, comprising the steps of: extracting, from a plurality of segments constituting an outline of a pattern in a coordinate system, segments respectively parallel with an x-axis and a y-axis of the coordinate system on the basis of at least two sets of coordinates indicating a position of each of the segments; and determining a horizontal boundary position of the outline on the basis of the respective sets of coordinates indicating the position of the segment parallel with the x-axis of the coordinate system, and determining a vertical boundary position of the outline on the basis of the respective sets of coordinates indicating the position of the segment parallel with the y-axis of the coordinate system.

In accordance with this aspect of the invention, in a first step, segments respectively parallel with the x-axis and the y-axis of the coordinate system are extracted from a plurality of segments constituting the outline on the basis of at least two sets of coordinates indicating the position of each of the segments. In an ensuing step, a horizontal boundary position of the outline is determined on the basis of the respective sets of coordinates indicating the position of the segment parallel with the x-axis, and a vertical boundary position of the outline is determined on the basis of the respective sets of coordinates indicating the position of the segment parallel with the y-axis.

The above and other objects, features and advantages of the present invention will become more apparent from the following detailed description of the invention when read in conjunction with the accompanying drawings.

DESCRIPTION OF THE PREFERRED EMBODIMENTS

Figures 3, 4:
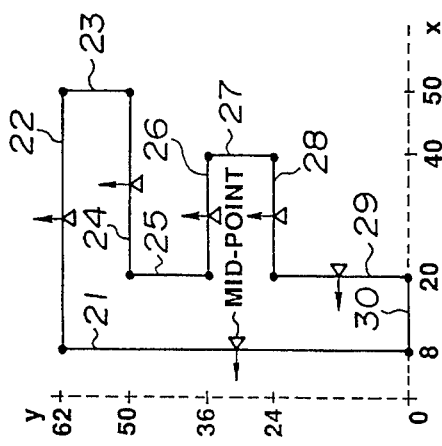
FIG. 3 is a diagram illustrating an example of horizontal/vertical boundary information table.
FIG. 4 is a diagram illustrating an example of an outline based on the outline font data.

Referring now to FIG. 4, a description will be given of a basic principle of the present invention.

FIG. 4 illustrates an example of an outline depicted in a two-dimensional coordinate system, in which the outline comprises segments 21–30. Outline font data showing this outline is formed by sequentially following the control-point coordinates of the respective segments 21–30 clockwise, the control-point coordinates arranged clockwise being (8, 0), (8, 62), (50, 62), . . . , (20, 24), (20, 0), and (8, 0), respectively.

The derivation of the horizontal boundary positions and vertical boundary positions of the outline is effected by following the respective control-point coordinates clockwise. Here, it is assumed that horizontal boundary positions parallel with the x-axis are first determined, and vertical boundary positions parallel with the y-axis are then determined. Also, it is assumed that the horizontal boundary positions are determined on the basis of the respective segments parallel with the x-axis and the vertical boundary positions are determined on the basis of the respective segments parallel with the y-axis, but that the horizontal boundary positions and vertical boundary positions are not determined in the case of segments whose length is not more than a predetermined threshold value "14."

Under these premises, determinations are made consecutively on the basis of the control-point coordinates as to whether or not the segments 21–30 are horizontal. For instance, as for the segment 21, since the values of the ordinates "0" and "62" of the control-point coordinates (8, 0), (8, 62) indicating the position of this segment are not equal, it is determined that this segment is not horizontal. In addition, as for the segment 22, since the values of the ordinates "62" and "62" of the control-point coordinates (8, 62), (50, 62) indicating the position of this segment are equal, it is determined that this segment is horizontal. In this manner, horizontal segments 22, 24, 26, 28, and 30 are obtained.

Then, among the horizontal segments, segments whose length is not more than the threshold value "14" are excluded. For instance, as for the segment 22, since the difference "42" between the values of the abscissas "8" and "50" of the control-point coordinates (8, 62), (50. 62) indicating the position of this segment is greater than the threshold value 14, this segment is not excluded. In addition, as for the segment 30, since the difference "12" between the values of the abscissas "20" and "8" of the control-point coordinates (20, 0), (8, 0) indicating the position of this segment is not more than the threshold value 14, this segment is excluded. In this manner, the horizontal segments 22, 24, 26, and 28 whose length exceeds the threshold value 14 are selected.

Then, the horizontal segments whose length exceeds the threshold value 14 are classified into upper segments and lower segments. Here, a mid-point of each segment is determined and each segment is classified into either the upper segment or the lower segment depending on the number of selected segments that are located upwardly of this mid-point. As for the segment 22, for example, midpoint coordinates (29, 62) are determined on the basis of the control-point coordinates (8, 62), (50, 62) indicating the position of this segment. Since there are no selected segments located upwardly of the mid-point coordinates and the number thereof is "0," this segment is determined to be an upper segment. In addition, as for the segment 24, mid-point coordinates (35, 50) are determined on the basis of the control-point coordinates (50, 50), (20, 50) indicating the position of this segment. Since only the segment 22 is selected as the segment located upwardly of these mid-point coordinates, and the number thereof is the odd number "1," this segment is determined to be a lower segment. Furthermore, as for the segment 26, since the segments 22, 24 are selected as the segments located upwardly of the mid-point coordinates of this segment, and the number thereof is the even number "2," this segment is determined to be an upper segment. As for the segment 28, meanwhile, the segments 22, 24, 26 are selected as the segments located upwardly of the mid-point coordinates of this segment, and the number thereof is the odd number "3," this segment is determined to be a lower segment. That is, the odd segments 22, 26 as counted from the upper end of the outline are set as the upper segments, and the even segments 24, 28 as counted therefrom are set as the lower segments. Of the segments thus classified, the upper segment 22 and the lower segment 24 are regarded as a pair forming the upper and lower sides of a closed curve. Similarly, the upper segment 26 and the lower segment 28 are also regarded as a pair forming the upper and lower sides of a closed curve.

Then, a maximum value and a minimum value are selected from the values of the ordinates of the control-point coordinates concerning the horizontal segments 22, 24, 26, 28, and 30, and a mean value of the maximum value and the minimum value is determined. Here, since the value of the ordinate "62" of the control-point coordinates (8, 62), (50, 62) indicating the position of the segment 22 is the maximum value, and the value of the ordinate "0" of the control-point coordinates (20, 0), (8, 0) indicating the position of the segment 30 is the minimum value, the mean value of the maximum value "62" and the minimum value "0" becomes "31." After determining the mean value "31" in this manner, in an upper region whose lower end is defined by a line parallel with the x-axis and perpendicular to the y-axis at the value "31", a pair of an upper segment and a lower segment included in that region is determined. Then, the value of the ordinate of the control-point coordinates indicating the position of the upper segment is set as a value indicating an outer boundary position. Meanwhile, the value of the ordinate of the control-point coordinates indicating the position of the lower segment is set as a value indicating an inner boundary position. In addition, in a lower region which is lower than the line parallel with the x-axis and perpendicular to the y-axis at the value "31", a pair of an upper segment and a lower segment that are included in that region is determined. Then, the value of the ordinate of the control-point coordinates indicating the position of the upper segment is set as a value indicating an inner boundary position, while the value of the ordinate of the control-point coordinates indicating the position of the lower segment included in that region is set as a value indicating an outer boundary position. For instance, the pair of the upper segment 22 and the lower segment 24 included in the upper region whose lower end is defined by the line parallel with the x-axis and perpendicular to the value "31" on the y-axis is obtained. Then, the value of the ordinate "62" of the control-point coordinates (8, 62), (50, 62) indicating the position of the upper segment 22 is set as the value indicating the outer boundary position, while the value of the ordinate "50" of the control-point coordinates (50, 50), (20, 50) indicating the position of the lower segment 24 included in that region is set as the value indicating the inner boundary position. It should be noted, however, that although the upper segment 26 and the lower segment 28 constituting a pair are located with the line parallel with the x-axis and perpendicular to the y-axis at the value "31" placed therebetween, in this case the value of the ordinate "36" of the control-point coordinates indicating the position of the upper segment 26 is set as the value indicating the inner boundary position, and the value of the ordinate "24" of the control-point coordinates indicating the position of the lower segment 28 is set as the value indicating the outer boundary position.

In this manner, two sets of outer and inner boundary positions in the horizontal direction are determined, in which one set of outer and inner boundary positions is expressed by the values of the ordinates "62" and "50," while the other set of outer and inner boundary positions is expressed by the values of the ordinates "24" and "36."

Subsequently, vertical boundary positions are determined, and procedures for determining the same are basically identical with those for determining horizontal boundary positions.

First, determinations are made consecutively on the basis of the control-point coordinates as to whether or not the segments 21–30 are vertical. That is, if the values of the abscissas of the coordinates of two control points indicating the position of a segment are equal, it is determined that this segment is vertical. If the two values are not equal, it is determined that this segment is not vertical. As a result, vertical segments 21, 23, 25, 27, 29 are obtained.

Then, among the vertical segments, segments whose length is not more than the threshold value "14" are excluded. As a result, the vertical segments 21, 29 whose length exceeds the threshold value 14 are selected.

Then, the vertical segments whose length exceeds the threshold value 14 are classified into left-hand segments and right-hand segments. Here, a mid-point of each segment is determined and each segment is classified into either the left-hand segment or the right-hand segment depending on the number of selected segments that are located leftwardly of this mid-point. As for the segment 21, for example, mid-point coordinates (8, 31) are determined on the basis of the control-point coordinates (8, 0), (8, 62) indicating the position of this segment. Since there are no selected segments located leftwardly of the mid-point coordinates and the number thereof is "0," this segment is determined to be a left-hand segment. In addition, as for the segment 29, mid-point coordinates (20, 12) are obtained on the basis of the control-point coordinates (20, 24), (20, 0) indicating the position of this segment. Since only the segment 21 is selected as the segment located leftwardly of these mid-point coordinates, and the number thereof is the odd number "1," this segment is determined to be a right-hand segment. That is, the odd segment 21 as counted from the left end of the outline is set as the left-hand segment, and the even segment 29 as counted therefrom is set as the right-hand segment. The left-hand segment 21 and the right-hand segment 29 are regarded as a pair forming the left-hand right-hand sides of a closed curve.

Then, a maximum value and a minimum value are selected from the values of the abscissas of the control-point coordinates concerning the vertical segments 21, 23, 25, 27, 29, and a mean value of the maximum value and the minimum value is determined. Here, since the value of the abscissa "50" of the control-point coordinates (50, 62), (50, 50) indicating the position of the segment 23 is the maximum value, and the value of the abscissa "8" of the control-point coordinates (8, 0), (8, 62) indicating the position of the segment 21 is the minimum value, the mean value of the maximum value "50" and the minimum value "8" becomes "29." After determining the mean value "29" in this manner, in a left-hand region whose right-hand end is defined by a line parallel with the y-axis and perpendicular to the x-axis at the value "29", a pair of a left-hand segment and a right-hand segment included in that region is determined. Then, the value of the abscissa of the control-point coordinates indicating the position of the left-hand segment is set as a value indicating an outer boundary position. Meanwhile, the value of the abscissa of the control-point coordinates indicating the position of the right-hand segment is set as a value indicating an inner boundary position. In addition, in a right-hand region located rightwardly of the line parallel with the y-axis and perpendicular to the value "29" on the x-axis, a pair of a left-hand segment and a right-hand hand segment that are included in that region is determined. Then, the value of the abscissa of the control-point coordinates indicating the position of the left-hand segment is set as a value indicating an inner boundary position, while the value of the abscissa of the control-point coordinates indicating the position of the right-hand segment included in that region is set as a value indicating an outer boundary position. For instance, the pair of the left-hand segment 21 and the right-hand segment 29 included in the left-hand region whose right-hand end is defined by the line parallel with the y-axis and perpendicular to the value "29" on the x-axis is obtained. Then, the value of the abscissa "8" of the control-point coordinates (8, 0), (8, 62) indicating the position of the left-hand segment 21 is set as the value indicating the outer boundary position, while the value of the abscissa "20" of the control-point coordinates (20, 24), (20, 0) indicating the position of the right-hand segment 29 included in that region is set as the value indicating the inner boundary position. It should be noted, however, that if the left-hand segment and the right-hand segment constituting a pair are located with the line parallel with the y-axis and perpendicular to the x-axis at the value "29" placed therebetween, the value of the abscissa of the control-point coordinates indicating the position of the left-hand segment is set as the value indicating the inner boundary position, and the value of the abscissa of the control-point coordinates indicating the position of the right-hand segment is set as the value indicating the outer boundary position.

In the above-described manner, one set of outer and inner boundary positions in the vertical direction are determined, in which the outer and inner boundary positions are expressed by the values of the abscissas "8" and "20," respectively.

Thus, the outer and inner boundary positions in the horizontal direction and the outer and inner boundary positions in the vertical direction are determined.

It should be noted that although, in classifying the horizontal segments whose length exceeds the threshold value 14 into upper segments and lower segments, odd segments as counted from the upper end of the outline are set as the upper segments, and even segments as counted therefrom are set as the lower segments, the classification of the lower and upper segments may be respectively based on whether the segment is odd or even as counted from the lower end of the outline. Similarly, although odd segments as counted from the left end of the outline are set as the left-hand segments, and the even segments as counted therefrom are set as the right-hand segments, the classification of the right-hand and left-hand segments may be respectively based on whether the segment is odd or even as counted from the right end of the outline.

In addition, as described above, a maximum value and a minimum value are selected from the values of the ordinates of the respective control-point coordinates concerning the horizontal segments, a mean value of the maximum value and the minimum value is determined, and a line parallel with the x-axis and perpendicular to the mean value on the y-axis is set as a reference. However, the present invention is not restricted to the same, and it suffices if a substantially central line in the direction of the y-axis can be set as a reference. The same holds true of the direction of the x-axis.

Furthermore, although horizontal segments and vertical segments are selected from the segments, it is possible to select substantially horizontal segments and substantially vertical segments therefrom. For instance, an inclination of ±0.05 degree or thereabouts may be allowed. In this case, the inclination of the segment can be calculated on the basis of the coordinates of two control points indicating the position of that segment. In addition, the value of the ordinate indicating a horizontal boundary position can be expressed by a mean value of the values of the ordinates of the coordinates of two control points of a segment, and the value of the abscissa indicating a vertical boundary position can be expressed by a mean value of the values of the abscissas of the coordinates of two control points of a segment.

Figure 1:
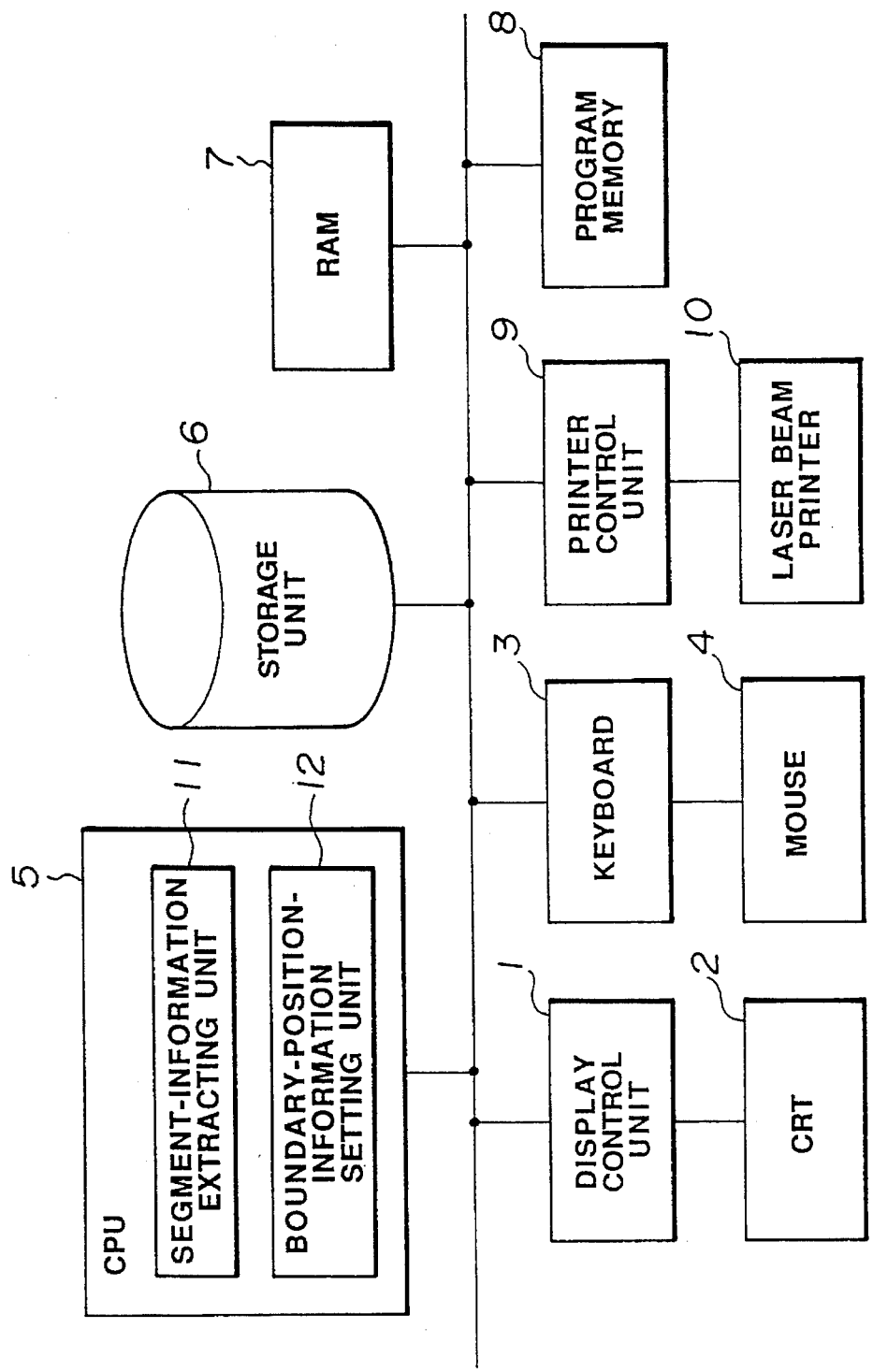
FIG. 1 is a functional block diagram illustrating an embodiment of an apparatus for pattern processing in accordance with the present invention.
Figure 2:
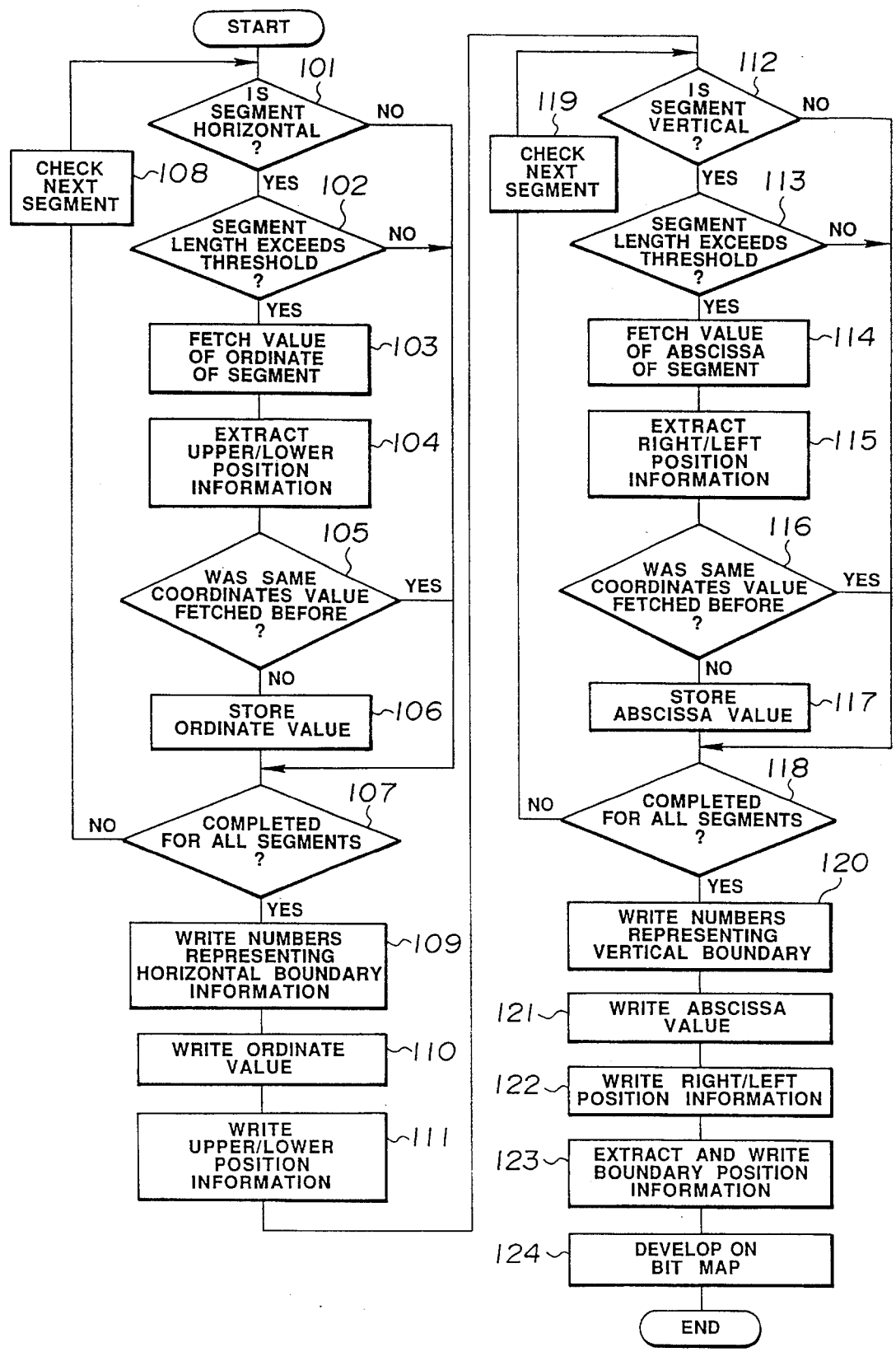
FIG. 2 is a flowchart illustrating processing procedures for determining horizontal boundary positions and vertical boundary positions on the basis of outline font data.

Referring now to FIGS. 1, 2, and 3, a description will be given of an embodiment of the present invention.

FIG. 1 is a block diagram illustrating an embodiment of an apparatus for pattern processing in accordance with the present invention.

In the drawing, a display control unit 1 is connected to a CRT 2 serving as a graphic display, and effects control for visibly displaying various data on the CRT 2.

A keyboard 3 is used for inputting various data for operating this apparatus, and is provided with a mouse 4 serving as a pointing device. Data and the like for printing can be directly inputted from the keyboard 3.

A CPU 5 controls this apparatus and executes calculations based on various commands. In addition, the CPU 5 incorporates a segment-information extracting unit 11 and a boundary-position-information setting unit 12. The segment-information extracting unit 11 extracts segments parallel with the x-axis and the y-axis from a plurality of segments constituting an outline. Meanwhile, the boundary-position-information setting unit 12 determines horizontal boundary positions of the outline on the basis of the segments parallel with the x-axis, and determines vertical boundary positions of the outline on the basis of the segments parallel with the y-axis.

A storage device 6 is an external storage device which stores, as a font file, outline font data indicating outlines, and also stores other data for retention, as required.

A RAM 7 is a memory which is used as a memory area for temporarily storing the outline font data or as a working area for processing outlines, and is also used for temporarily storing a program for operating the apparatus and for temporarily storing various data.

Stored in a program memory 8 are a control program for executing various functions for this apparatus, a segment-information extracting program, a boundary-position-information setting program, and the like.

A printer control unit 9 is used for controlling printing by a laser beam printer 10, and various data is recorded on recording paper through this printing control.

In the above-described configuration, processing procedures for deriving horizontal boundary positions and vertical boundary positions from the outline font data will be described with reference to a flowchart shown in FIG. 2.

First, the CPU 5 reads outline font data indicating an outline shown in FIG. 4 from the storage device 6, and causes the outline font data to be stored in the RAM 7. In addition, the CPU 5 reads the segment-information extracting program and the boundary-position-information setting program from the program memory 8, and starts the segment-information extracting unit 11 and the boundary-position-information setting unit 12.

The segment-information extracting unit 11 consecutively fetches the segments of the outline clockwise on the basis of the outline font data, and determines whether or not the segment fetched is horizontal (Step 101) and whether or not the length of the segment exceeds a threshold value (Step 102). If the segment is horizontal and its length is longer than the threshold value (YES in Step 101 and YES in Step 102), the value of the ordinate of control-point coordinates indicating the position of the segment is determined (Step 103). Then, the segment-information extracting unit 11 determines mid-point coordinates of the segment, and classifies the segment into either an upper segment or a lower segment depending on the number of the other horizontal segments located upwardly of the mid-point coordinates (Step 104). Furthermore, the segment-information extracting unit 11 determines whether or not the value of the ordinate determined in Step 103 is identical with the value of the ordinate previously determined (Step 105), and if they are not identical (NO in Step 105), the value of the ordinate determined in Step 103 is stored (Step 106). Subsequently, a determination is made as to whether or not the processing of the foregoing Steps 101 to 106 has been effected with respect to all the segments of the outline (Step 107). If there is a segment not subjected to the processing (NO in Step 107), that segment is fetched (Step 108), and the processing is effected with respect to that segment.

Upon completion of the processing of Steps 101 to 106 with respect to all the segments (YES in Step 107), the segment-information extracting unit 11 writes in a horizontal/vertical boundary information table shown in FIG. 3 the number of horizontal segments whose length exceeds the threshold value, the values of the ordinates indicating the positions of the segments, and whether the segments are the upper or lower segments (Steps 109, 110, and 111). Incidentally, this horizontal/vertical boundary information table is formed in the RAM 7.

In the horizontal/vertical boundary information table, the value "4," i.e., the number of the horizontal segments 22, 24, 26, 28 whose length exceeds the threshold value, is written in an area 31. In addition, the values of the ordinates indicating the positions of the respective segments are written in areas 33–36 in an ascending order. Furthermore, areas 39–42 correspond to the areas 33–36, respectively. Specifically, the value "0" is written in the area 39 since the segment 28 at the position indicated by the value "24" in the area 33 is a lower segment; the value "1" is written in the area 40 since the segment 25 at the position indicated by the value "36" in the area 34 is an upper segment; the value "0" is written in the area 41 since the segment 24 at the position indicated by the value "50" in the area 35 is a lower segment; and the value "1" is written in the area 42 since the segment 22 at the position indicated by the value "62" in the area 36 is an upper segment.

Subsequently, the segment-information extracting unit 11 performs extraction of vertical segments in the same way as the extraction of the horizontal segments. That is, the segment-information extracting unit 11 consecutively fetches the segments of the outline clockwise, and determines whether the segment is vertical (Step 112), and whether the length of the segment exceeds the threshold value (Step 113). If the segment is vertical and its length is longer than the threshold value (YES in Step 112 and YES in Step 113), the segment-information extracting unit 11 determines the value of the abscissa indicating the position of the segment (Step 114). Then, the segment-information extracting unit 11 determines mid-point coordinates of the segment, and classifies the segment into either a left-hand segment or a right-hand segment depending on the number of the other vertical segments located leftwardly of the midpoint coordinates (Step 115). Furthermore, the segment-information extracting unit 11 determines whether or not the value of the abscissa determined in Step 114 is identical with the value of the abscissa previously determined (Step 116), and if they are not identical (NO in Step 116), the value of the abscissa determined in Step 114 is stored (Step 117). Subsequently, a determination is made as to whether or not the processing of the foregoing Steps 112–117 has been effected with respect to all the segments of the outline (Step 118). If there is a segment not subjected to the processing (NO in Step 118), that segment is fetched (Step 119), and the processing is effected with respect to that segment.

Upon completion of the processing of Steps 112–117 with respect to all the segments (YES in Step 118), the segment-information extracting unit 11 writes in the horizontal/vertical boundary information table shown in FIG. 3 the number of vertical segments whose length exceeds the threshold value, the values of the abscissas indicating the positions of the respective segments, and whether the segments are the left-hand or right-hand segments (Steps 120, 121, 122).

In the horizontal/vertical boundary information table, the value "2," i.e., the number of the vertical segments 21, 29 whose length exceeds the threshold value, is written in an area 32. In addition, the values of the abscissas indicating the positions of the respective segments are written in areas 37, 38 in an ascending order. Furthermore, areas 43, 44 correspond to the areas 37, 38, respectively. Specifically, the value "1" is written in the area 43 since the segment 21 at the position indicated by the value "8" in the area 37 is a left-hand segment; and the value "0" is written in the area 44 since the segment 29 at the position indicated by the value "20" in the area 38 is a right-hand segment.

Then, the boundary-position-information setting unit 12 selects a maximum value and a minimum value from the areas 33–36 in the horizontal/vertical boundary information table, determines a mean value of the ordinate from the maximum value and the minimum value, and then determines the respective values in the areas 33–36 as outer boundary positions and inner boundary positions by using the mean value of the ordinate as a reference, as mentioned above, and by referring to the values in the areas 39–42 indicating whether the segments are the upper or lower segments, the results thereof being written in areas 45–48 (Step 123). That is, the value "24" in the area 33 is determined to correspond to an outer boundary position, and its result is the value "1" written in the area 45. In addition, the value "36" in the area 34 is determined to correspond to an inner boundary position, and its result is the value "0"

written in the area 46. Furthermore, the value "50" in the area 35 is determined to correspond to an inner boundary position, and its result is the value "0" written in the area 47. Additionally, the value "62" in the area 36 is determined to correspond to an outer boundary position, and its result is the value "1" written in the area 48.

Similarly, the boundary-position-information setting unit 12 selects a maximum value and a minimum value from the areas 37, 38 in the horizontal/vertical boundary information table, determines a mean value of the abscissa from the maximum value and the minimum value, and then determines the respective values in the areas 37, 38 as an outer boundary position and an inner boundary position by using the mean value of the abscissa as a reference, as mentioned above, and by referring to the values in the areas 43, 44 indicating whether the segments are the left-hand or right-hand segments, the results thereof being written in areas 49, 50 (Step 123). That is, the value "8" in the area 37 is determined to correspond to an outer boundary position, and its result is the value "1" written in the area 49. In addition, the value "0" in the area 38 is determined to correspond to an inner boundary position, and its result is the value "0" written in the area 50.

Thus, the outer and inner boundary positions in the horizontal direction and the outer and inner boundary positions in the vertical direction are written in the horizontal/vertical boundary information table. Subsequently, the CPU 5 determines an outline provided with reduction or enlargement as well as correction, on the basis of the outline font data, the outer and inner boundary positions in the horizontal direction, and the outer and inner boundary positions in the vertical direction, and develops the pattern of this outline on a bit map so as to obtain a pattern of a required size (Step 124).

It should be noted that although in Steps 105 and 116 a determination is made as to whether or not the value of ordinate or abscissa of the control-point coordinates is identical with the value of the ordinate or abscissa determined previously, the present invention is not restricted to the same. For instance, a determination is made as to whether or not the two values are substantially identical. In this case, it is possible to prevent the boundary positions from approaching each other excessively.

In addition, if the contents written in the horizontal/vertical boundary information table are retained, it becomes unnecessary to repeat the same processing. In that case, if an attempt is made to reduce the amount of data stored in the memory, it suffices if the processing is repeated each time the outline is subjected to enlargement or reduction.

What is claimed is:

1. An apparatus for drawing graphic characters, comprising:

outline data storing means for storing outline data containing a plurality of segments each having two ends and coordinates of both ends of each of the plurality of segments;

first segment extracting means for sequentially selecting the plurality of segments stored in the outline data storing means by sequentially tracing in a predetermined direction the coordinates stored in the outline data storing means, and extracting from the plurality of segments, horizontal segments extending substantially in horizontal directions and having lengths longer than a predetermined length;

second segment extracting means for sequentially selecting the plurality of segments stored in the outline data storing means by sequentially tracing in a predetermined direction the coordinates stored in the outline data storing means, and extracting, from the plurality of segments, vertical segments extending substantially in vertical directions and having lengths longer than a predetermined length;

means for determining upper and lower regions of the character or graphic symbol;

means for determining left-hand and right-hand regions of the character or graphic symbol;

first judgment means for providing a judgment result, and judging based on the relative position of y-coordinate values of the centers of the horizontal segments extracted by the first segment extracting means, whether the horizontal segments constitute upper segments or lower segments of the horizontal strokes of a character or a graphic symbol formed by the horizontal segments, within said upper and lower regions;

second judgment means for providing a judgment result, and judging based on the relative position of x-coordinate values of the centers of the vertical segments extracted by the second segment extracting means, whether the vertical segments constitute right segments or left segments of vertical strokes of the character or the graphic symbol formed by the vertical segments, within said right-hand and left-hand regions;

horizontal boundary information storing means for storing as horizontal boundary information upper and lower segments extracted by the first segment extracting means and a judgment result by the first judgment means;

vertical boundary information storing means for storing as vertical boundary information right and left segments extracted by the second segment extracting means and a judgment result by the second judgment means; and bit map development means for enlarging or reducing the character or the graphic symbol indicated by the outline data by referring to the horizontal boundary information stored in the horizontal boundary information storing means and the vertical boundary information stored in the vertical boundary information storing means and developing it into bit map data.

2. The apparatus as set forth in claim 1, further comprising:

y-axis direction center calculating means, based on average values of maximum values and minimum values of the y-coordinate values of the coordinates of the two ends of each of the plurality of segments stored in the outline data storing means, for determining a center in the y-direction of the character or the graphic symbol indicated by the outline data;

x-axis direction center calculating means, based on average values of maximum values and minimum values of the x-coordinate values of the coordinates of the two ends of each of the plurality of segments stored in the outline data storing means, for determining a center in the x-axis direction of the character or the graphic symbol indicated by the outline data;

third judgment means for judging whether the horizontal segments extracted by the first segment extracting means are outer segments or inner segments of the character or the graphic symbol indicated by the outline data, based on information indicative of an upper-lower relationship of the horizontal segments judged by the first judgment means and the center in the y-axis direction of the character or the graphic symbol indicated by the outline data calculated by the y-axis direction center calculation means; and fourth judgment means for judging whether the vertical segments extracted by the second segment extracting means are outer segments or inner segments of the character or the graphic symbol indicated by the outline data, based on information indicative of a right-left relationship of the vertical segments judged by the second judgment means and the center in the x-axis direction of the character or the graphic symbol indicated by the outline data calculated by the x-axis direction center calculation means; and the bit map development means, by referring to the judgment results of the third and fourth judgment means, enlarges or reduces the character or the graphic symbol indicated by the outline data and develops it into bit map data.

3. The apparatus as set forth in claim 2, wherein the third judgment means, when the y-coordinate values of the coordinates of the two ends of each of the horizontal segments extracted by the first segment extracting means are smaller than the center in the y- axis direction of the character or the graphic symbol indicated by the outline data calculated by the y-axis direction center calculation means, judges the horizontal segments judged as the lower segments by the first judgment means to be the outer segments and the horizontal segments judged as the upper segments to be the inner segments, and when the y-coordinate values of the coordinates of the two ends of each of the horizontal segments extracted by the first segment extracting means are greater than the center in the y-axis direction of the character or the graphic symbol indicated by the outline data calculated by the y-axis direction center calculation means, judges the horizontal segments judged as the upper segments by the first judgment means to be the outer segments and the horizontal segments judged as the lower segments to be the inner segments.

4. The apparatus as set forth in claim 2, wherein the fourth judgment means, when the x-coordinate values of the coordinates of the two ends of each of the vertical segments extracted by the second segment extracting means are smaller than the center in the x-axis direction of the character or the graphic symbol indicated by the outline data calculated by the x-axis direction center calculation means, judges the vertical segments judged as the right segments by the second judgment means to be the outer segments and the vertical segments judged as the left segments to be the inner segments, and when the x-coordinate values of the coordinates of the two ends of each of the vertical segments extracted by the second segment extracting means are greater than the center in the x-axis direction of the character or the graphic symbol indicated by the outline data calculated by the x-axis direction center calculation means, judges the vertical segments judged as the left segments by the second judgment means to be the outer segments and the vertical segments judged as the right segments to be the inner segments.

5. The apparatus as set forth in claim 2, wherein the third judgment means, when the center in the y-axis direction of the character or the graphic symbol indicated by the outline data calculated by the y-axis direction center calculation means is in between the upper segments and the lower segments of the horizontal strokes judged by the first judgment means, judges the upper segments as the inner segments and the lower segments as the outer segments.

6. The apparatus as set forth in claim 2, wherein the fourth judgment means, when the center in the x-axis direction of the character or the graphic symbol indicated by the outline data calculated by the x-axis direction center calculation means is in between the left segments and the right segments of the vertical strokes judged by the second judgment means, judges the left segments as the inner segments and right segments as the outer segments.

7. A method of drawing graphic characters, comprising the steps of:

sequentially selecting a plurality of segments having two ends stored in an outline data storing means for storing outline data containing the plurality of segments and coordinates of both ends of each of the plurality of segments by sequentially tracing in a predetermined direction the coordinates stored in the outline data means, and extracting, from the plurality of segments, horizontal segments extending substantially in horizontal directions and having lengths longer than a predetermined length;

sequentially selecting the plurality of segments stored in the outline data storing means by sequentially tracing in a predetermined direction the coordinates stored in the outline data storing means, and extracting, from the plurality of segments, vertical segments extending substantially in vertical directions and having lengths longer than a predetermined length;

determining upper and lower regions of the character of graphic symbol;

determining left-hand and right-hand regions of the character, or graphic symbol;

judging, based on the relative position of y-coordinate values of the centers of the horizontal segments extracted in the first step, whether the horizontal segments extracted in the first step, whether the horizontal segments constitute upper segments or lower segments of the horizontal strokes of a character or a graphic symbol formed by the horizontal segments, within said upper and lower region;

judging, based on the relative position of x-coordinate values of the centers of the vertical segments extracted in the second step, whether the vertical segments constitute right segments or left segments of the vertical strokes of a character or a graphic symbol formed by the vertical segments, within said right-hand and left-hand regions;

storing as horizontal boundary information upper and lower segments extracted in the first step and a judgment result obtained in the third step;

storing as vertical boundary information right and left segments extracted in the second step and a judgment result obtained in the fourth step; and enlarging or reducing the character or the graphic symbol indicated by the outline data by referring to the horizontal boundary information stored in the fifth step and the vertical boundary information stored in the sixth step and developing it into bit map data.

8. The method as set forth in claim 7, further comprising:

an eighth step of determining, based on average values of maximum values and minimum values of the y-coordinate values of the coordinates of the two ends of each of the plurality of segments stored in the outline data storing means, a center in the y-direction of the character or the graphic symbol indicated by the outline data;

a ninth step of determining, based on average values of maximum values and minimum values of the x-coordinate values of the coordinates of the both ends of each of the plurality of segments stored in the outline data storing means, a center in the x-axis direction of the character or the graphic symbol indicated by the outline data;

a tenth step of judging, based on information indicative of an upper-lower relationship of the horizontal segments judged in the third step and the center in the y-axis direction of the character or the graphic symbol indicated by the outline data calculated in the eighth step, whether the horizontal segments extracted in the first step are outer segments or inner segments of the character or the graphic symbol indicated by the outline data; and an eleventh step of judging, based on information indicative of a right-left relationship of the vertical segments judged in the fourth step and the center in the x-axis direction of the character or the graphic symbol indicated by the outline data calculated in the ninth step, whether the vertical segments extracted in the second step are outer segments or inner segments of the character or the graphic symbol indicated by the outline data;

wherein in the seventh step, the character or the graphic symbol indicated by the outline data is enlarged or reduced and developed into the bit map data by referring to the judgment results of the third and fourth judgment means.

9. The method as set forth in claim 8, wherein in the tenth step, when the y-coordinate values of the coordinates of the two ends of each of the horizontal segments extracted in the first step are smaller than the center in the y-axis direction of the character or the graphic symbol indicated by the outline data calculated in the eighth step, the horizontal segments judged as the lower segments in the third step are judged as the outer segments and the horizontal segments judged as the upper segments are judged as the inner segments, and when the y-coordinate values of the coordinates of the two ends of each of the horizontal segments extracted in the first step are greater than the center in the y-axis direction of the character or the graphic symbol indicated by the outline data calculated in the eighth step, the horizontal segments judged as the upper segments in the third step are judged as the outer segments and the horizontal segments judged as the lower segments are judged as the inner segments.

10. The method as set forth in claim 8, wherein in the eleventh step, when the x-coordinate values of the coordinates of the two ends of each of the vertical segments extracted in the second step are smaller than the center in the x-axis direction-of the character or the graphic symbol indicated by the outline data calculated in the ninth step, the vertical segments judged as the right segments in the fourth step are judged as the outer segments and the vertical segments judged as the left segments are judged as the inner segments, and when the x-coordinate values of the coordinates of the two ends of each of the vertical segments extracted in the second step are greater than the center in the x-axis direction of the character or the graphic symbol indicated by the outline data calculated in the ninth step, the vertical segments judged as the left segments in the fourth step are judged as the outer segments and the vertical segments judged as the right segments are judged as the inner segments.

11. The method as set forth in claim 8, wherein in the tenth step, when the center in the y-axis direction of the character or the graphic symbol indicated by the outline data calculated in the eighth step is in between the upper segments and the lower segments of the horizontal strokes judged in the third step, the upper segments are judged as the inner segments and lower segments are judged as the outer segments.

12. The method set forth in claim 8, wherein in the eleventh step, when the center in the x-axis direction of the character or the graphic symbol indicated by the outline data calculated in the ninth step is in between the left segments and the right segments of the vertical strokes judged in the fourth step, the left segments are judged as the inner segments and right segments are judged as the outer segments.

* * * * *